(12) United States Patent
Litwin

(10) Patent No.: US 6,877,508 B2
(45) Date of Patent: Apr. 12, 2005

(54) EXPANSION BELLOWS FOR USE IN SOLAR MOLTEN SALT PIPING AND VALVES

(75) Inventor: Robert Zachary Litwin, Canoga Park, CA (US)

(73) Assignee: The Boeing Company, Chicago, IL (US)

( * ) Notice: Subject to any disclaimer, the term of this patent is extended or adjusted under 35 U.S.C. 154(b) by 48 days.

(21) Appl. No.: 10/301,923

(22) Filed: Nov. 22, 2002

(65) Prior Publication Data

US 2004/0099261 A1 May 27, 2004

(51) Int. Cl.$^7$ .................................................. F24J 2/46
(52) U.S. Cl. ..................... 126/651; 126/618; 126/609; 126/709
(58) Field of Search ........................ 126/638, 680, 126/710, 709, 704, 609, 624, 618, 675, 640, 674, 651; 136/206

(56) References Cited

U.S. PATENT DOCUMENTS

| | | | | |
|---|---|---|---|---|
| 3,916,871 A | * | 11/1975 | Estes et al. | 126/709 |
| 3,954,097 A | * | 5/1976 | Wilson, Jr. | 126/656 |
| 4,180,055 A | * | 12/1979 | Hudnall | 126/684 |
| 4,308,912 A | * | 1/1982 | Knecht | 126/635 |
| 4,469,088 A | * | 9/1984 | Anzai et al. | 126/618 |
| 4,513,779 A | * | 4/1985 | Owoc et al. | 137/556 |
| 4,554,908 A | * | 11/1985 | Hanlet et al. | 126/652 |
| 4,643,212 A | | 2/1987 | Rothrock | |
| 4,765,956 A | | 8/1988 | Smith et al. | |
| 5,862,800 A | | 1/1999 | Marko | |
| 5,947,114 A | * | 9/1999 | Kribus et al. | 126/680 |

FOREIGN PATENT DOCUMENTS

| | | | | |
|---|---|---|---|---|
| JP | 61-93348 A | * | 5/1986 | F24J/2/46 |
| WO | WO 92/11495 A1 | * | 7/1992 | F24J/2/00 |

* cited by examiner

Primary Examiner—Josiah C. Cocks
(74) Attorney, Agent, or Firm—Harness Dickey & Pierce P.L.C.

(57) ABSTRACT

A solar thermal energy transmission system having a bellows that sealingly interconnects a first structure to a second structure is disclosed. The bellows includes a surface that is compatible with a molten salt and is configured to resiliently deform in response to contraction and expansion of at least one of the first and second structures, to thereby accommodate relative movement of the structure(s) to which it is coupled.

5 Claims, 3 Drawing Sheets

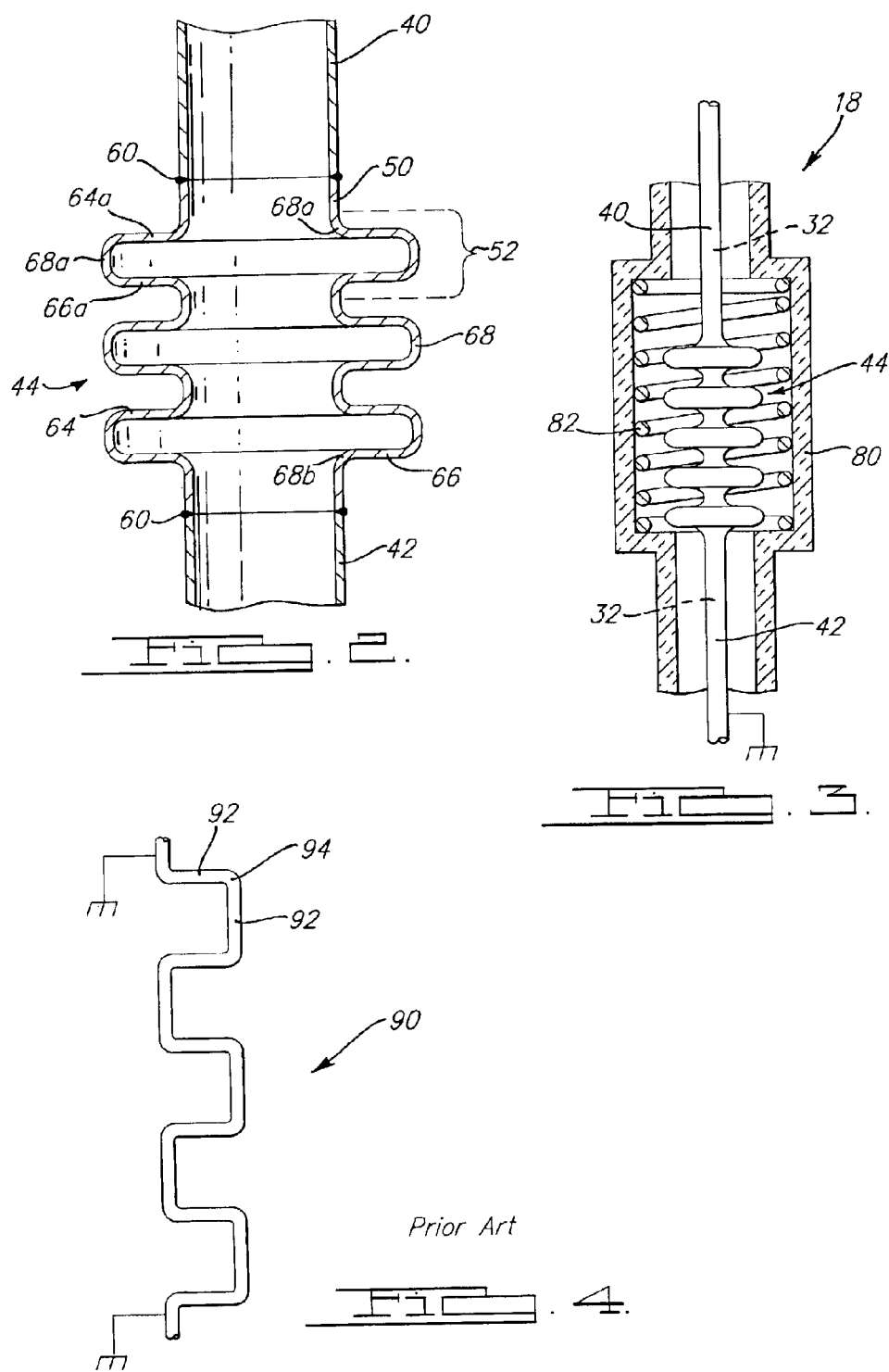

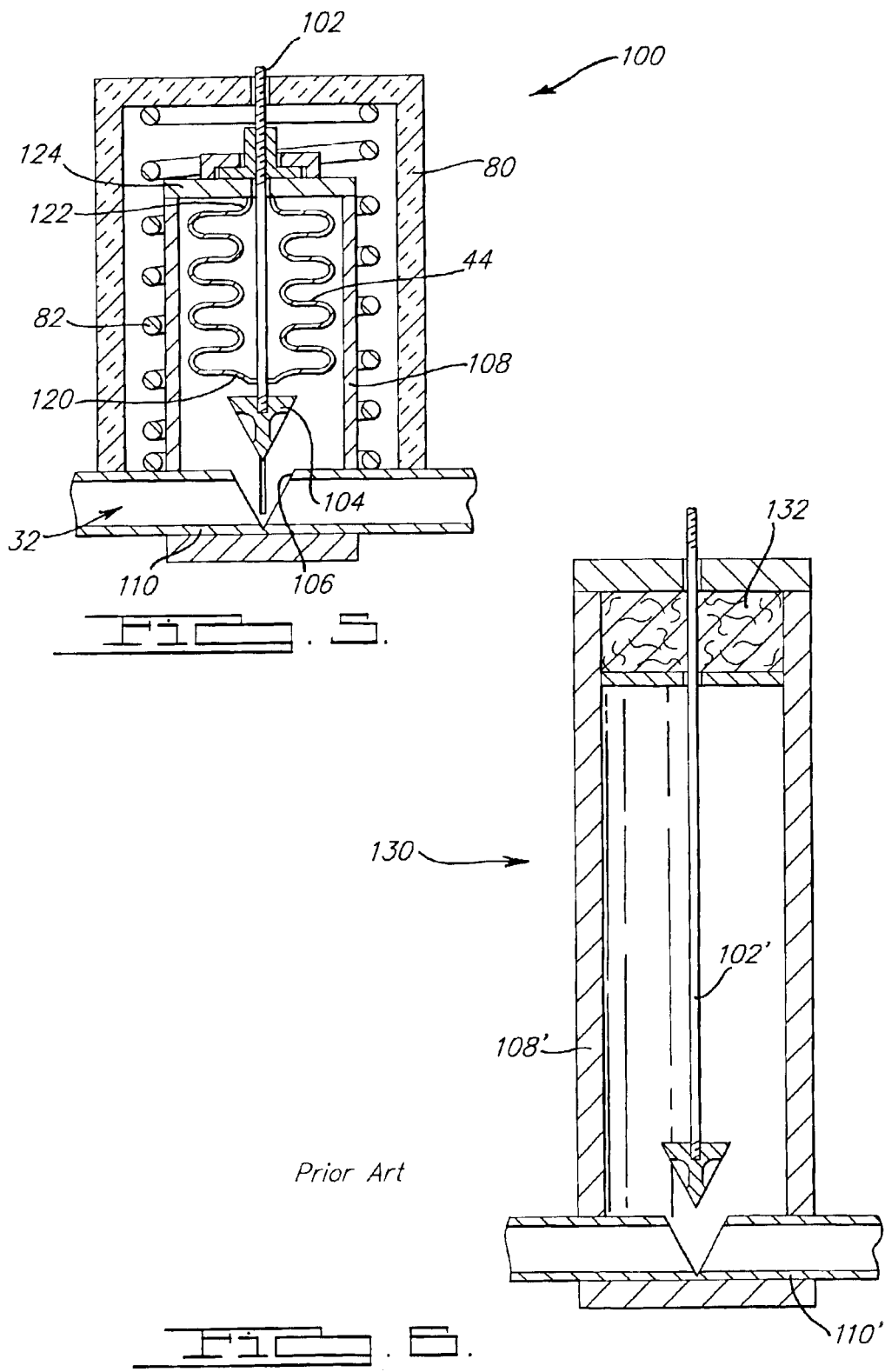

EXPANSION BELLOWS FOR USE IN SOLAR MOLTEN SALT PIPING AND VALVES

FIELD OF THE INVENTION

The present invention relates generally to thermal energy transmission systems and more particularly to the accommodation of cyclic thermal expansion and contraction in the piping and valves of such systems.

BACKGROUND OF THE INVENTION

Molten salts, such as a potassium nitrate ($KNO_3$) and sodium nitrate ($NaNO_3$) mixture, are used as a thermal transfer medium in solar power plants. Typically, reflectors are used to concentrate solar energy at a receiver. The receiver operates as a heat exchange device to raise the temperature of the molten salt as the molten salt is pumped through the receiver. The outside surface of the receiver can reach temperatures that exceed 1200° F. (650° C.). The molten salt is then transferred to a thermal storage tank and then to a heat exchanger to generate steam.

Molten salts are chosen for their heat transfer characteristics and handling requirements. Mixtures of $KNO_3$ and $NaNO_3$ salts are in the liquid phase while in the operational temperature range of a solar receiver facility. The operational temperature range for a solar receiver facility is typically 550° F. to 1050° F. (290° C. to 560° C.). For power generation, the molten salts are necessarily heated in the solar energy receiver and cooled in the heat exchanger.

The heat exchanger typically transfers this thermal energy to a working fluid such as water. The heated water is converted to steam in the heat exchanger which can be used to power a steam turbine-generator to produce electricity.

The piping and equipment used to transport the molten salts experience thermal expansion and contraction as the system is started, operated and shut down. As with most land-based solar power applications, this cycle is repeated daily as the sun rises to heat the receiver. Most of the piping and equipment of a solar facility are allowed to cool to ambient temperatures at night. Thermal expansion of equipment and piping will lead to induced stresses as pipe lengths increase between fixed points. With a receiver located atop a tower several hundred feet in height, several inches of axial thermal expansion must be accommodated. Expansion loops, such as a series of pipe sections connected by 90° ells or a piping spiral, can be installed in piping to relieve some of these induced stresses, but require more piping which increases material costs and thermal losses. Additionally, expansion loops require more space, maintenance and installation costs and time.

Another issue that arises when using molten salt in a solar power application is leak prevention. Both $KNO_3$ and $NaNO_3$ are severe oxidizers and contact with fuels at elevated temperatures can cause combustion. Penetrations into the molten salt equipment, such as valve stems, are potential areas for leaks. Periodic inspection and maintenance are required to ensure that any leaks are minimized.

Molten salt is typically required to be at temperatures in excess of 500° F. (260° C.) to remain in the liquid phase since its freezing temperature is approximately 430° F. (220° C.). Equipment used to transfer molten salt is maintained above this minimum temperature to ensure that the molten salt does not freeze. Electrical heat tracing is typically used to maintain this minimum temperature. Freezing of the salt in equipment can cause reduced flow up to a total flow stoppage. In the event of a freeze out of salt in a length of piping or equipment, special care must be exercised when thawing the salt. Upon thaw, salt expands and can damage pipe and equipment if a free surface is not available. If the molten salt cannot be fully drained from pipes or equipment, solidification will occur as the salt is cooled. These solid portions of salt can restrict flow or damage equipment upon restart.

Conventional valve stem seals for molten salt applications use dynamic friction seals. Most valve stem seals experience a high short term failure rate at an operating temperature of 1050° F. (560° C.). In previous solar molten salt facilities, the valve stem and bonnet were lengthened in order to separate the valve stem seal from the flow of molten salt. This modification provided a lower operating temperature for the valve stem seals and resulted in a longer service life. With longer valve stems, valve failures such as plastic stem twisting and stem buckling become more likely. Additionally, valve locations are limited when greater clearance is needed for the lengthened valve stem/bonnet.

What is needed is a containment device for molten salt that will accommodate axial expansion, withstand thousands of cycles, reduce the potential for leaks, and allow maximum drainage while providing a long operating life at elevated temperatures.

SUMMARY OF THE INVENTION

The present invention is directed to an expandable metal bellows for accommodating axial movement in molten salt containment equipment. In one preferred form the present invention provides a metal bellows that is located within a length of piping. The metal bellows will contract and expand axially with thermal growth of the piping. The metal bellows can also accommodate lateral movement of the attached equipment and piping.

In another preferred form the present invention provides a metal bellows to seal a valve stem. The metal bellows permits axial movement of the valve stem while providing a positive seal. This embodiment of the bellows will also accommodate any limited lateral movement of the valve stem. The bellows valve stem seal obviates the need for lengthened valve stems and bonnets.

In another preferred form the present invention provides a metal bellows constructed from an appropriate material such as a low cycle fatigue Inconel 625 alloy. The bellows wall has a generally circular cross-section taken perpendicular to the axis of the bellows. The bellows wall is contoured along the axis of the bellows. Thus formed, the wall thickness of the metal bellows is capable of withstanding a high temperature, high pressure environment while providing sufficient elasticity to allow the bellows to expand and contract along the axis of the bellows.

In another preferred form the present invention provides an external heat source to provide a minimum desired temperature for a metal bellows used in a thermal transfer system.

Further areas of applicability of the present invention will become apparent from the detailed description provided hereinafter. It should be understood that the detailed description and specific examples are intended for purposes of illustration only and are not intended to limited the scope of the invention.

BRIEF DESCRIPTION OF THE DRAWINGS

The present invention will become more fully understood from the detailed description and the accompanying drawings, wherein:

FIG. 2 is a sectional view of a preferred embodiment of the bellows of the present invention;

FIG. 3 is a view of a piping system with the bellows of FIG. 2 in accordance with a preferred embodiment;

FIG. 4 is a view of a prior art piping system;

FIG. 5 is a sectional view of a valve utilizing the bellows of FIG. 2 in a preferred embodiment; and FIG. 6 is a sectional view of a prior art valve.

DETAILED DESCRIPTION OF THE PREFERRED EMBODIMENTS

Figure 1:
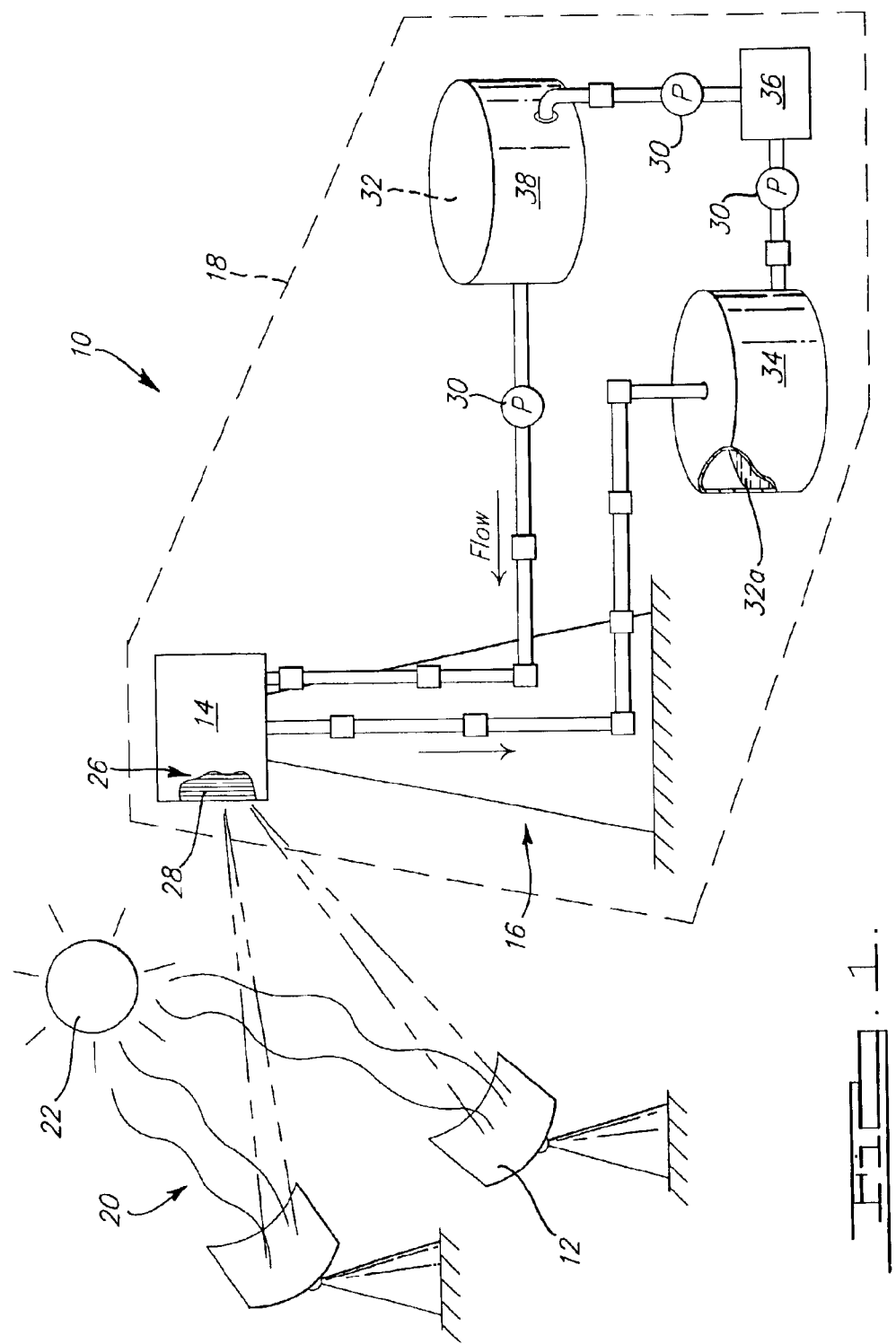
FIG. 1 is a schematic view of a solar power facility.

The following description of the preferred embodiment(s) is merely exemplary in nature and is in no way intended to limit the invention, its application, or uses.

With reference to FIG. 1 of the drawings, an exemplary solar power plant is generally indicated by reference numeral 10. The solar power plant 10 includes a plurality of heliostats 12, a receiver 14 mounted atop a tower 16, and a solar thermal energy transfer system 18 constructed in accordance with the teachings of the present invention.

Aside from the solar thermal energy transfer system 18, the solar power plant 10 is conventional in its construction and operation and as such, need not be described in significant detail. Briefly, solar energy 20 produced by the sun 22 is reflected by the heliostats 12 and concentrated at the receiver 14. The receiver 14 absorbs the energy reflected by the heliostats 12 in the form of heat. The receiver 14 includes one or more molten salt solar absorption panels 26, each having a plurality of tubes 28.

Solar thermal energy transfer system 18 includes pumps 30 to transfer a molten salt 32 in a closed loop system. Solar thermal energy transfer system 18 transfers the hot molten salt 32a from the tubes 28 of receiver 14 to a hot storage tank 34. Hot storage tank 34 is sized to accumulate hot molten salt 32a until hot molten salt 32a is desired for electrical generation. In this manner, hot storage tank 34 can be used in a thermal storage capacity. To generate electrical power, hot molten salt 32a is transferred by pumps 30 from hot storage tank 34 to a heat exchanger 36 which, in the particular example provided, is employed to heat water and generate steam for use in a conventional steam turbine (not shown). The temperature of hot molten salt 32a is reduced from approximately 1050° F. (560° C.) to 550° F. (290° C.) as it flows through heat exchanger 36. A cold storage tank 38 accumulates molten salt 32 from heat exchanger 36. Using pumps 30, solar thermal energy transfer system 18 transfers molten salt 32 from cold storage tank 38 to tubes 28 of receiver 14 to complete the thermal transfer cycle. While the working fluid utilized in solar thermal energy transfer system 18 is identified as a molten salt, it would be recognized by one skilled in the art that other fluids, such as liquid sodium (Na) or sodium-potassium (NaK) could be substituted.

In FIG. 2, a portion of the piping of the solar thermal energy transfer system 18 is illustrated to include a first conduit 40 and a second conduit 42. The conduits 40 and 42 are coupled together by an expansion bellows 44 in accordance with a preferred embodiment of the present invention. The first and second conduits 40 and 42 are conventional in their construction and may be of, for example, a seamless, welded or welded and drawn construction and formed from a material that is compatible with the molten salt 32 contained therein. In the particular example provided, the first and second conduits 40 and 42 are formed from low-cycle fatigue 625 alloy disclosed in U.S. Pat. No. 5,862,800 to Marko entitled "Molten Nitrate Salt Solar Central Receiver of Low Cycle Fatigue 625 Alloy", and U.S. Pat. No. 4,765,956 to Smith, et al., entitled "Nickel—Chromium Alloy of Improved Fatigue Strength", the disclosures of which are hereby incorporated by reference as if fully set forth herein.

The bellows 44 is shown to include a pair of annular connecting portions 50 and one or more convolutions 52. The bellows 44 may be unitarily formed from a material that is compatible with the molten salt, such as the aforementioned low cycle fatigue 625 alloy, or may have a composite construction wherein, for example, various materials are formed into annular rings that are layered in a concentric manner. In the particular example provided, the bellows 44 is of a composite construction having an inner layer 54 (not shown) that is formed of a material that is compatible with the molten salt, such as low cycle fatigue 625 alloy, and an outer layer 56 (not shown) that is formed from stainless steel. As those skilled in the art will appreciate, the composite construction provides the bellows 44 with the characteristics of the materials from which it is constructed. In the example provided, the low cycle fatigue 625 alloy provides chemical compatibility with the molten salt, while the stainless steel provides added strength.

The annular connecting portions 50 are sized to receive an associated one of the first and second conduits 40 and 42. A continuous weld bead 60 is illustrated to sealingly couple each of the annular connecting portions 50 to an associated one of the first and second conduits 40 and 42.

Each convolution 52 is illustrated in cross section, having an upper wall 64 that is interconnected to a lower wall 66 at a pivot interface 68. The upper and lower walls 64 and 66 may be skewed or generally parallel to one another and intersect at the pivot interface 68. The convolution or convolutions 52 resiliently interconnect the annular connecting portions 50. In the particular embodiment illustrated, the upper wall 64a of a first one of the convolutions 52 intersects a first one of the annular connecting portions 50 at an upper pivot interface 68a and the lower wall 66a of a last one of the convolutions 52 intersects a second one of the annular connecting portions 50 at a lower pivot interface 68b. Preferably, convolutions 52 are constructed such that lower walls 66 will not pool molten salt 32 when solar thermal energy transfer system 18 is drained.

During start-up of the solar thermal energy transfer system 18, thermal energy is absorbed by the solar thermal energy transfer system 18 causing the various components thereof, including the first and second conduits 40 and 42 and the bellows 44, to expand in their overall length. As the distance between the receiver 14 (FIG. 1) and the storage tanks, 34, 38 (FIG. 1) remains constant, convolutions 52 of bellows 44 axially contract in response to the axial expansion of first and second conduits 40 and 42. In this manner, a portion of the thermal expansion of solar thermal energy transfer system 18 is absorbed by bellows 44, thereby reducing a portion of the associated forces, stresses and moments.

With reference to FIG. 3, a portion of solar thermal energy transfer system 18 is shown in accordance with a preferred embodiment of the present invention to include a bellows 44 and a first and second conduits 40 and 42. Solar thermal energy transfer system 18 is located within an insulation 80 and a heat source 82. Heat source 82 is provided to maintain a minimum temperature of the solar thermal energy transfer system 18 to prevent a freeze out of molten salt 32. Heat source 82 is preferably a conventional electrical resistance element that is contoured to the exterior surface of solar thermal energy transfer system 18. Bellows 44 is oriented in a generally vertical manner within solar thermal energy transfer system 18 to allow for maximum drainage of the molten salt 32 during each daily shutdown.

FIG. 4 shows a prior art piping arrangement 90. Piping arrangement 90 utilizes a series of sections of pipe 92 that are connected via a series of ells 94. In this manner, thermal expansion of piping arrangement 90 is absorbed by lateral deflection of pipes 92.

With reference to FIG. 5, a valve 100 in accordance with a preferred embodiment of the present invention is shown. Valve 100 includes a stem 102, a gate (or plug) 104, a plurality of seats 106, a bonnet 108, a body 110 and an operator (not shown). The operator can be a hand wheel, pneumatic actuator, electric motor-gearbox, or equivalent. Preferably, bonnet 108 is enclosed in insulation 80 with a heat source 82 to maintain valve 100 above the freezing temperature of molten salt 32.

In operation, the operator causes stem 102 to move axially within bonnet 108. This movement causes gate 104 to move toward or away from seats 106 which are connected to body 110. When gate 104 contacts seats 106, valve 100 is in the closed position and flow of molten salt 32 ceases through body 110. When the operator moves stem 102 and causes gate 104 to lift from seats 106, flow of molten salt 32 is permitted through body 110. Typically, gate 104 can be lifted into bonnet 108 to allow unobstructed flow of molten salt 32 through body 110. Bellows 44 is located within bonnet 108. A first end 120 of bellows 44 is attached to stem 102. A second end 122 of bellows 44 is attached to a distal end 124 of bonnet 108.

Preferably, both the first end 120 and second end 122 of bellows 44 are welded at their attachment locations to stem 102 and bonnet 108 distal end 124 to provide a leak resistant seal. In this manner, bellows 44 can expand and contract as stem 102 moves axially while providing a reliable seal within bonnet 108. It should be noted that molten salt 32 will be on the exterior surface of bellows 44 within valve 100. As shown in FIG. 5, bellows 44 is contracted when valve 100 is opened. One skilled in the art will recognize that molten salt 32 is not allowed to pool on the surface of bellows 44 when solar thermal energy transfer system 18 is drained.

FIG. 6 shows a prior art valve 130 used for molten salt applications wherein stem 102' is sealed within bonnet 108' with a prior art seal 132. Stem 102' and bonnet 108' are lengthened to protect prior art seal 132 from the extreme temperatures and oxidizing affect of the flow of molten salt 32 through body 110'. Stem 102' slides within prior art seal 132 as prior art valve 130 is operated. As one skilled in the art will recognize, bellows 44 provides valve 100 (FIG. 5) with a leak resistant seal that is more reliable than the frictional seal between stem 102' and prior art seal 132.

The present invention thus provides a bellows 44 for use in piping systems where a degree of expansion and contraction of pipes or conduits, which affects the lengths of these components, needs to be accommodated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A solar thermal energy transmission system comprising:

a first structure;

a second structure; and a bellows interposed between and sealingly interconnecting the first and second structures, the bellows having an interior surface and an exterior surface wherein at least one of the exterior and interior surfaces is compatible with a molten salt, the bellows being configured to resiliently deform in response to contraction and expansion of at least one of the first and second structures; wherein the first structure extends through an aperture in the second structure and the bellows inhibits fluid communication of the molten salt through the aperture.

2. The solar thermal energy transmission system of claim 1, wherein the first structure comprises a valve stem and the second structure comprises a bonnet.

3. The solar thermal energy transmission system of claim 2, wherein the bellows is sealingly welded to a perimeter of the valve stem.

4. The solar thermal energy transmission system of claim 1, further comprising an insulative shroud adapted to insulate the bellows.

5. The solar thermal energy transmission system of claim 1, further comprising an auxiliary heater coupled to the second structure and being configured to heat said molten salt adjacent the bellows.

* * * * *